United States Patent
Krishnan

(10) Patent No.: US 7,936,764 B1
(45) Date of Patent: May 3, 2011

(54) METHOD FOR OPTIMIZING IP ROUTE TABLE SIZE THROUGH IP ROUTE AGGREGATION

(75) Inventor: Ram Krishnan, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 285 days.

(21) Appl. No.: 12/100,246

(22) Filed: Apr. 9, 2008

(51) Int. Cl.
*H04L 12/28* (2006.01)

(52) U.S. Cl. .................................. 370/395.31; 370/401

(58) Field of Classification Search .................. None
See application file for complete search history.

(56) References Cited

U.S. PATENT DOCUMENTS

| | | | | |
|---|---|---|---|---|
| 7,453,883 B1 * | 11/2008 | Lynch et al. | ............... | 370/395.32 |
| 2003/0002443 A1 * | 1/2003 | Basso et al. | ................... | 370/237 |
| 2005/0232264 A1 * | 10/2005 | Wybenga et al. | ............. | 370/389 |

OTHER PUBLICATIONS

Po-Chou Lin ; Chung-Ju Chang , "A priority TCAM IP-routing lookup scheme", Jul. 2003, IEEE Communications Letters, vol. 7 , Issue:7, pp. 337-339.*

Liu, Huan , "Reducing Routing Table Size Using Ternary-CAM", Paper appears in: Hot Interconnects Sep. 2001; Publication Date: 2001; on pp. 69-73; meeting dates Aug. 22-24, 2001; Stanford, CA, USA; ISBN: 0-7695-1357-3; Department of Electrical Engineering, Stanford Univ, CA.

Wang, Gesan , et al., "TCAM-Based Forwarding Engine with Minimum Independent Prefix Set (MIPS) for Fast Updating", Paper appears in: Communications, 2006, ICC '06, IEEE International Conference; publication date: Jun. 2006; vol. 1, on pp. 103-109; ISSN: 8164-9547; ISBN: 1-4244-0355-3; Center for Advanced Computer Studies, University of Louisiana at Lafayette, LA.

* cited by examiner

*Primary Examiner* — Chirag G Shah
*Assistant Examiner* — Salvador E Rivas
(74) *Attorney, Agent, or Firm* — Blakely, Sokoloff, Taylor & Zafman

(57) ABSTRACT

A subset of route entries having the same next hop is identified in a route table. The subset of entries falls within a range of prefixes. Gaps in the subset of route entries that prevent the subset from being contiguous are identified. The gaps in the subset are filled with route entries to make the subset contiguous. All of the route entries in the contiguous subset of route entries have the same next hop, thus the contiguous subset can be aggregated into a single route entry in a forwarding table. For each gap-filling entry added to the route table, an additional route entry having forwarding priority over the gap-filling entry is added to the forwarding table.

11 Claims, 4 Drawing Sheets

METHOD FOR OPTIMIZING IP ROUTE TABLE SIZE THROUGH IP ROUTE AGGREGATION

FIELD

Embodiments of the invention relate to networking, and more particularly to IP route tables.

BACKGROUND

The size of the typical Internet Protocol (IP) route table has increased by an order of magnitude in the last few years. The dramatic growth of routing tables necessitates more router memory space and processing power. For example, the number of prefixes in the Border Gateway Protocol (BGP) core routing table is approximately 240,000, and is increasing.

As the number of IP routes increases, an increasing amount of memory is required for both slow path forwarding and fast path forwarding (data plane) of a routing switch device.

The data (or forwarding) plane defines the part of a router architecture that decides what to do with packets arriving on an inbound interface. Most commonly, the data plane references a forwarding/route table to look up the destination address in the incoming packet header, and retrieve information that describes the outgoing interface(s) through which to send the incoming packet. The data plane generally stores IP routes of the forwarding/route table in specialized hardware designed for efficient lookup. One example of such hardware is a ternary content addressable memory, or TCAM.

As the IP forwarding/route table size increases, it requires more TCAM space. TCAMs are expensive chips and they consume more power and dissipate more heat, which imposes significant challenges on the system designer. Thus, increasing the number of TCAM chips on a routing switch device is not a practical or cost effective alternative. Insufficient TCAM space for IP routes may result in un-deterministic IP forwarding behavior. In other words, some of the data traffic might be forwarded along a non-optimal path; some data traffic might be slow-path forwarded and some data traffic may not get forwarded at all (e.g., a packet is dropped) due to the limited capacity of the control plane forwarding engine.

SUMMARY

A subset of route entries having the same next hop is identified in a route table. The subset of entries falls within a range of prefixes. Gaps in the subset of route entries that prevent the subset from being contiguous are identified. For example, if the entries "1," "2," "4," "5" and "6" belong to a subset, then the missing entry "3" is identified. The identified gaps in the subset are filled with route entries to make the subset contiguous. All of the route entries in the contiguous subset of route entries have the same next hop, thus the contiguous subset can be aggregated into a single route entry in a forwarding table. For each gap-filling entry added to the route table, an additional corresponding route entry having priority over the gap-filling entry is added. The additional corresponding entry will be a longer prefix match in the forwarding table than the gap-filling entry, facilitating forwarding to the appropriate next hop (as opposed to the next hop of the contiguous subset).

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
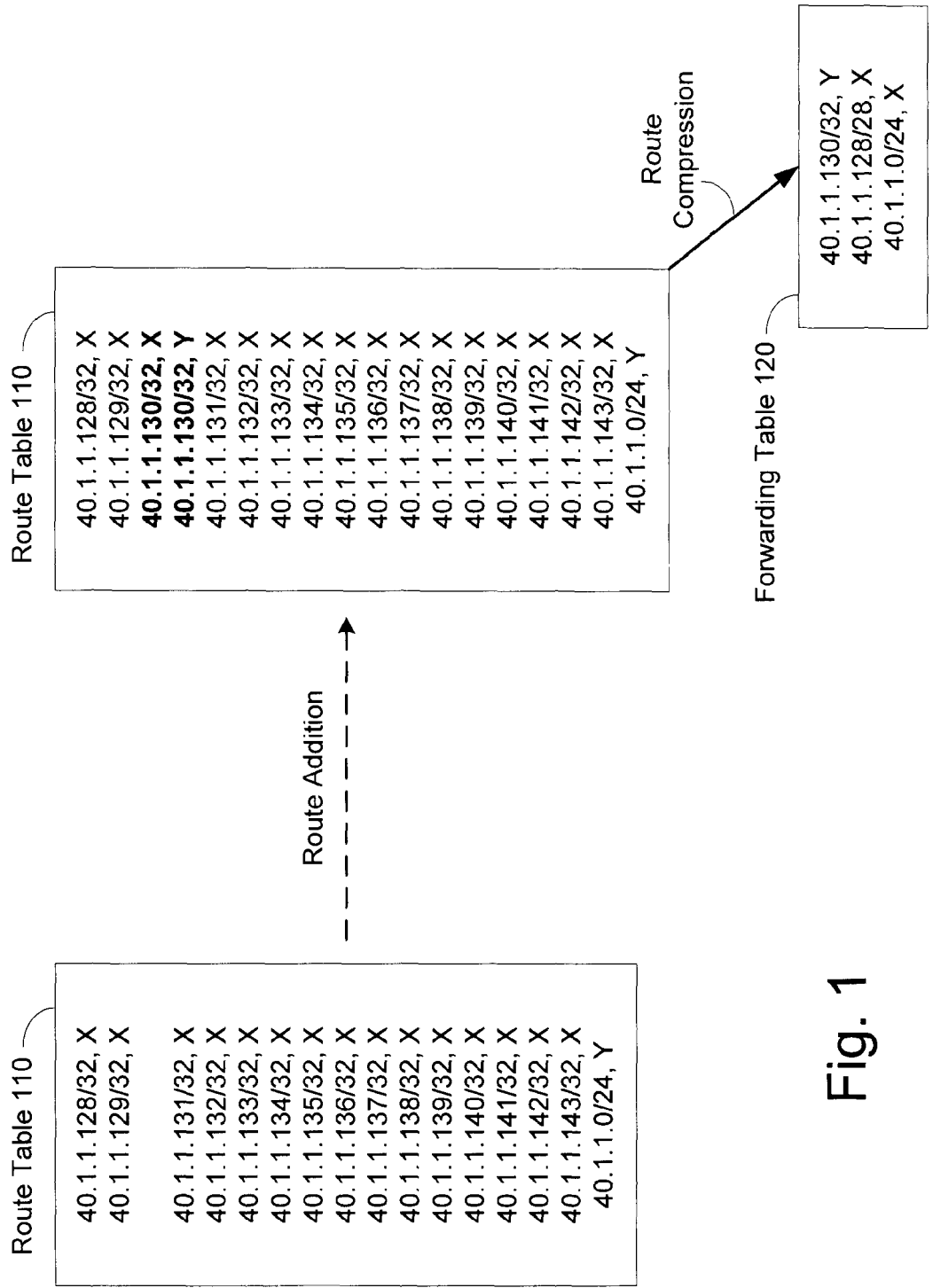
FIG. 1 illustrates examples of entries in a route table and a forwarding table according to various embodiments.

As provided herein, methods, apparatuses, and systems enable reduction of IP route table size via a route compression algorithm. The number of possible egress paths in a routing table is typically small because only a limited number of interface cards can fit into a router chassis. In contrast, the number of routing prefixes is typically very large—in the range of several hundred thousand.

Internet Protocol (IP) route tables consist of route entries. A route entry contains an IP prefix and a corresponding gateway (or interface ID) through which data will be forwarded. An IP prefix, or simply prefix, is an IP address followed by a subnet mask. For example, the prefix "192.168.224.0/24" has an IP network address of 192.168.224.0 and a subnet mask of 24. A subnet mask reveals how much of the IP address should be used for the subnet ID and how much is left for the actual host ID. Thus, a subnet mask of 24 means that the first 24 bits (first 3 octets) of the IP address should be used for the subnet ID. As used herein, a first prefix is "longer" than a second prefix if the subnet mask of the first prefix is longer than the subnet mask of the second prefix.

A gateway is a node on a network that serves as an entrance to another network. In enterprises, the gateway could be, for example, the computer that routes the traffic from a workstation to the outside network that is serving the Web pages. In homes, the gateway might be, for example, the Internet Service Provider (ISP) that connects the user to the internet.

An IP route table is often maintained as or represented by a specialized tree (e.g., radix tree, Patricia tree, or trie) for efficient lookup (e.g., longest prefix match (LPM)). The specialized tree maintains IP prefixes in such a way that any node in the tree is a sub-route of all its children. In other words, a child node in the tree is a super-route of its parent node. The term "node" is used interchangeably herein to refer to a route and/or a prefix given that a node is representative of a route and/or a prefix.

The term "route table" is frequently used generically to describe any table having routing entries. Route tables, generically, are frequently stored in a route manager database, although they could also be store elsewhere (e.g., RAM, flash memory, etc.) Herein, the route table used for slow-path forwarding is referred to as the "kernel route table." The route table available in the data plane (e.g., in a TCAM, etc.) is referred to as the "hardware route table." The term "forwarding table" is used herein to refer to both the kernel route table and the hardware route table. The route table associated with the routing process is referred to below as simply the "route table."

Some embodiments described herein may refer to a TCAM as storing IP route entries. However, embodiments of the invention are hardware independent—any hardware can be used in accordance with the scope and spirit of the invention.

The route compression techniques described herein reduce the number of routing entries to be stored in the forwarding table without altering the actual data forwarding behavior. Note that the techniques described herein will not reduce the size of the routing table associated with the routing process—the routing process's routing table will still hold all the routing entries. However, the routing process will apply the route compression algorithm before installing the routes into the forwarding table.

Table 1 illustrates an Internet Protocol version 4 (IPv4) routing table organized based on prefix length:

TABLE 1

IPv4 Route Table Before Route Compression

| No. | Prefix Length | Route | Next Hop |
| --- | --- | --- | --- |
| 1 | 32 | 40.1.1.128 | 100.2.3.1 |
| 2 | 32 | 40.1.1.129 | 100.2.3.1 |
| 3 | 32 | 40.1.1.131 | 100.2.3.1 |
| 4 | 32 | 40.1.1.132 | 100.2.3.1 |
| 5 | 32 | 40.1.1.133 | 100.2.3.1 |
| 6 | 32 | 40.1.1.134 | 100.2.3.1 |
| 7 | 32 | 40.1.1.135 | 100.2.3.1 |
| 8 | 32 | 40.1.1.136 | 100.2.3.1 |
| 9 | 32 | 40.1.1.137 | 100.2.3.1 |
| 10 | 32 | 40.1.1.138 | 100.2.3.1 |
| 11 | 32 | 40.1.1.139 | 100.2.3.1 |
| 12 | 32 | 40.1.1.140 | 100.2.3.1 |
| 13 | 32 | 40.1.1.141 | 100.2.3.1 |
| 14 | 32 | 40.1.1.142 | 100.2.3.1 |
| 15 | 32 | 40.1.1.143 | 100.2.3.1 |
| 16 | 32 | 40.1.1.0 | 100.2.3.5 |

Route numbers 1 to 15 have the same next hop (100.2.3.1). Using an existing known route compression technique, the resulting forwarding table would be as shown in Table 2 below:

TABLE 2

IPv4 Forwarding Table After Traditional Route Compression

| No. | Prefix Length | Route | Next Hop |
| --- | --- | --- | --- |
| 1 | 32 | 40.1.1.131 | 100.2.3.1 |
| 2 | 31 | 40.1.1.128 (40.1.1.128, 40.1.1.129) | 100.2.3.1 |
| 3 | 30 | 40.1.1.132 (40.1.1.132, 40.1.1.133, 40.1.1.134, 40.1.1.135) | 100.2.3.1 |
| 4 | 29 | 40.1.1.136 (40.1.1.136, 40.1.1.137, 40.1.1.138, 40.1.1.139, 40.1.1.140, 40.1.1.141, 40.1.1.142, 40.1.1.143) | 100.2.3.1 |
| 5 | 24 | 40.1.1.0 | 100.2.3.5 |

The existing known route compression technique uses edge compression looking for trailing bits that can be combined. As seen in Table 2, the routes 40.1.1.128/32 and 40.1.1.129/32 share the same next hop (100.2.3.1) and differ only in the last bit. Thus, these two entries can be combined as 40.1.1.128/31. In this case, the last bit of each entry is wildcarded (i.e., ignored, treated as irrelevant, etc.). Also in Table 2, the routes 40.1.1.132/32, 40.1.1.133/32, 40.1.1.1.34/32 and 40.1.1.135/32 share the same next hop (100.2.3.1) and differ only in the last 2 bits. Thus, these four entries can be combined as 40.1.1.132/30. In this case, the last 2 bits of each entry are wildcarded. Finally in Table 2, the routes 40.1.1.136/32, 40.1.1.137/32, 40.1.1.138/32, 40.1.1.139/32, 40.1.1.140/32, 40.1.1.141/32, 40.1.1.142/32 and 40.1.1.143/32 share the same next hop (100.2.3.1) and differ only in the last 3 bits. Thus, these 8 entries can be combined as 40.1.1.136/29. Overall, the traditional route compression technique was able to reduce the 16 example route entries in the route table to 5 entries in the forwarding table.

The basic concepts of the route compression technique used in various embodiments of the invention are as follows. In a prefix list, any missing prefixes which prevent route compression (i.e., prefixes which, if included in the list, would cause the list to be contiguous) must be identified. For example, the prefix list in Table 1 is missing the entry for 40.1.1.130/32. Once the missing routes have been identified, these routes are added to the prefix list. However, in order to preserve the appropriate forwarding behavior, an additional route entry having forwarding priority must also be added.

Referring again to the example in Table 1, the missing route 40.1.1.130/32 needs to be added to the prefix list in the route table. By adding 40.1.1.130/32, a contiguous subset is formed which can be aggregated into the forwarding table as a single route entry, 40.1.1.128/28. Prior to adding the 40.1.1.130/32 route, any packet destined for the address 40.1.1.130 would have been forwarded to the next hop 100.2.3.5 because the longest prefix match for 40.1.1.130 would have been 40.1.1.0/24. Thus, in addition to adding the 40.1.1.130/32 route with a next hop of 100.2.3.1, an additional 40.1.1.130/32 route having a next hop of 100.2.3.5 must be added. Thus, when the 40.1.1.130/32 route with the next hop of 100.2.3.1 is aggregated into the 40.1.1.128/28 route, the additional 40.1.1.132/32 route with the next hop of 100.2.3.5 will be a longest prefix match for 40.1.1.130. Accordingly, any traffic destined for 40.1.1.130 will be appropriately forwarded through the next hop 100.2.3.5. The resulting forwarding table is shown in Table 3 below:

TABLE 3

IPv4 Forwarding Table After Novel Route Compression

| No. | Prefix Length | Route | Next Hop |
| --- | --- | --- | --- |
| 1 | 32 | 40.1.1.130 | 100.2.3.5 (Next hop of 40.1.1.0/24) |
| 2 | 28 | 40.1.1.128 (40.1.1.128, 40.1.1.129, 40.1.1.130, 40.1.1.131, 40.1.1.132, 40.1.1.133, 40.1.1.134, 40.1.1.135, 40.1.1.136, 40.1.1.137, 40.1.1.138, 40.1.1.139, 40.1.1.140, 40.1.1.141, 40.1.1.142, 40.1.1.143) | 100.2.3.1 |
| 3 | 24 | 40.1.1.0 | 100.2.3.5 |

Continuing with a variation on the above example, deleting the prefix 40.1.1.135/32 from the route table (refer to Table 1) would necessitate ungrouping the 40.1.1.128/28 route in the forwarding table (refer to Table 3) using traditional compression techniques. However, in various embodiments of the present invention, entries deleted from the route table can be maintained in the forwarding table in order to preserve the contiguity for compression. In order to preserve the appropriate forwarding behavior, an additional route entry having forwarding priority must also be added. So, if 40.1.1.135/32 is deleted from the route table, the 40.1.1.135/32 route can be maintained in the forwarding table with a next hop of 100.2.3.1. The additional route 40.1.1.135/32 with a next hop of 100.2.3.5 must also be added to the forwarding. The additional route preserves the proper forwarding behavior. The resulting forwarding table is illustrated in Table 4, below:

TABLE 4

IPv4 Forwarding Table After Novel Route Compression with Route Deletion

| No. | Prefix Length | Route | Next Hop |
|---|---|---|---|
| 1 | 32 | 40.1.1.130 | 100.2.3.5 (Next hop of 40.1.1.0/24) |
| 2 | 32 | 40.1.1.135 | 100.2.3.5 (Next hop of 40.1.1.0/24) |
| 3 | 28 | 40.1.1.128 (40.1.1.128, 40.1.1.129, 40.1.1.130, 40.1.1.131, 40.1.1.132, 40.1.1.133, 40.1.1.134, 40.1.1.135, 40.1.1.136, 40.1.1.137, 40.1.1.138, 40.1.1.139, 40.1.1.140, 40.1.1.141, 40.1.1.142, 40.1.1.143) | 100.2.3.1 |
| 4 | 24 | 40.1.1.0 | 100.2.3.5 |

FIG. 1 illustrates a route table and a forwarding table using the example entries discussed above. Initially, route table 110 is missing an entry that prevents the subset of entries in the table from being contiguous. Once the missing entry (e.g., 40.1.1.130/32) is identified, two entries are added to route table 110. One of the added entries has the same next hop as all of the other entries in the subset (e.g., X) while the other added entry has the next hop (e.g., Y) of the entry (e.g., 40.1.1.0/24) that would have been the longest prefix match for the missing entry if not for the added entries. Thus, when the updated route table 110 is compressed, the resulting forwarding table 120 achieves better compression than traditional compression techniques without altering the forwarding behavior of forwarding table 120.

Figure 2A:
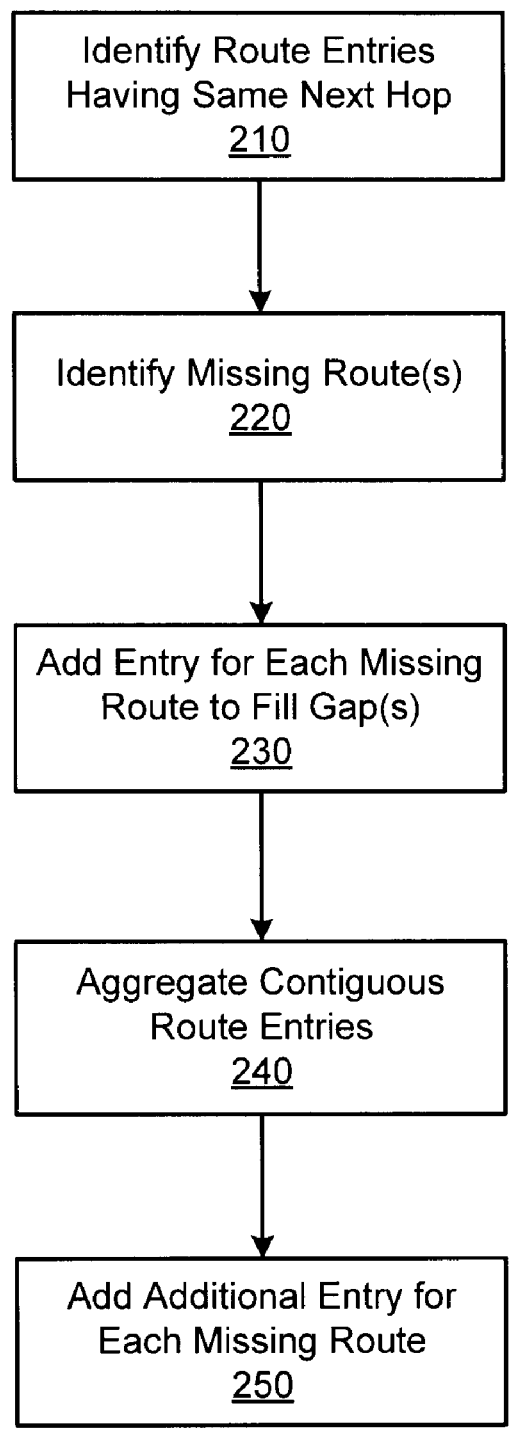
FIG. 2A is a flow diagram illustrating a process for reducing forwarding table size according to various embodiments.

FIG. 2A is a flow diagram illustrating a process for reducing forwarding table size according to various embodiments. Routes entries (e.g., within a set or subset) having the same next hop are identified in a route table 210. From the identified routes that share a common next hop, missing routes are identified 220. As used herein, the term "missing routes" refers to routes within a set or subset of routes for which there are no route entries in the route table. Thus, for example, if a route table included the routes 1, 2, 3, 4 and 6, then 5 would be considered a missing route. In other embodiments, a missing route could be a route within the subset having a different next hop. For each missing route in the subset, a route entry is added to the route table to fill in the gap(s) 230. Each added route entry has the same next hop as all of the other entries in the subset. The added entries allow the subset of entries to be contiguous. Thus, the contiguous route entries are aggregated into a single route entry in the forwarding table 240.

For each added entry, an additional entry is also added 250. Each additional entry has forwarding priority over its corresponding added entry. For example, an additional entry might have a prefix that is longer than the prefix of its corresponding added entry and/or longer than the single aggregated route entry. In this way, the additional entry will have a longer prefix match than the added entry and will, therefore, take priority for forwarding decisions. The additional entry has the next hop of the route entry that would otherwise control forwarding of traffic destined for the missing route if no entries were added for the purpose of subset contiguity. In this way, any route additions will not alter the forwarding behavior of the forwarding table.

Figure 2B:
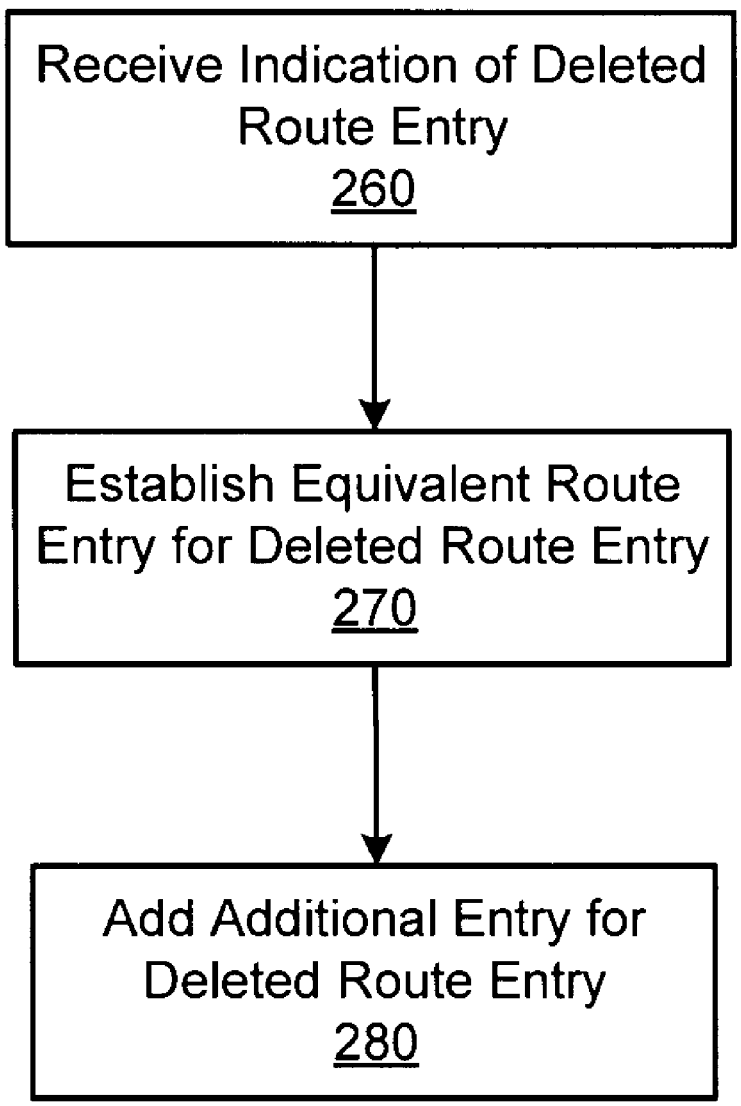
FIG. 2B is a flow diagram illustrating a process for reducing forwarding table size after deletion of a route entry according to various embodiments.

FIG. 2B is a flow diagram illustrating a process for reducing forwarding table size after deletion of a route entry according to various embodiments. Deletion of a route entry from a route table can break up a contiguous set or subset of route entries (e.g., the 40.1.1.128/28 subset of Table 3 above). Thus, when an indication of a deleted route entry is received 260, an equivalent route entry is established to replace the deleted route entry 270. Establishing an equivalent route entry could be accomplished by maintaining the existing route entry in the table despite the indication that it is to be deleted; alternatively, an equivalent copy of the route entry could be added or re-added to the table. By establishing the equivalent entry, the contiguity of the relevant subset of entries is maintained for route compression. However, in order to preserve the appropriate forwarding behavior, an additional entry is added for the deleted route entry 280. The additional entry has forwarding priority (e.g., it will be a longest prefix match) over the equivalent entry. The additional entry contains the next hop of the route entry that would otherwise control packet forwarding if no equivalent entry were established for the deleted entry.

While several embodiments described above are discussed with references to IPv4 routes, other types of routes (e.g., IPv6 routes) could be used in other embodiments. In embodiments that utilize equal-cost multi-path (ECMP) routing, the routes that have ECMP paths or next hops are compressed only if certain conditions are met. If the conditions are not met, sub-optimal forwarding may occur. The conditions include:

The number of ECMP paths for a given entry must match the number of ECMP paths of the other route entries in the subset.

The set of gateways and/or next hops for the route entry must match exactly with the gateways and/or next hops of the other route entries in the subset.

Figure 3:
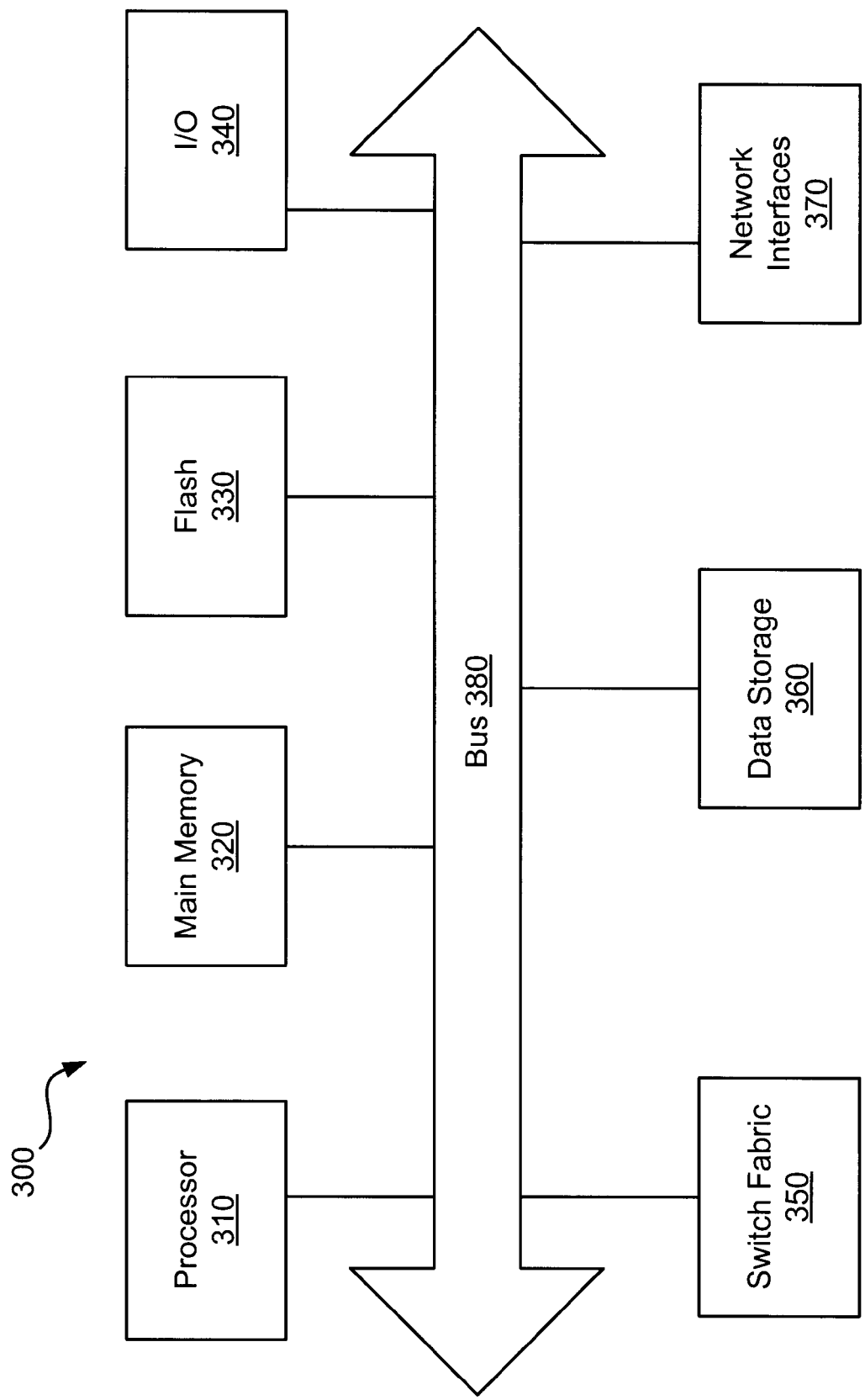
FIG. 3 is a block diagram illustrating a computing environment suitable for reducing IP forwarding table size according to various embodiments.

FIG. 3 illustrates computing environment in which certain aspects of the invention illustrated in FIGS. 1, 2A and 2B may be practiced in various embodiments. Collectively, these components are intended to represent a broad category of hardware systems, including but not limited to general purpose computer systems and specialized network switches.

Computer system 300 includes processor 310, I/O devices 340, main memory 320 and flash memory 330 coupled to each other via a bus 380. Main memory 320, which can include one or more of system memory (RAM), and nonvolatile storage devices (e.g., magnetic or optical disks), stores instructions and data for use by processor 310. Additionally, the network interfaces 370, data storage 360, and switch fabric 350 are coupled to each other via a bus 380. Data storage 360 represents the routing database (i.e., route tables) described herein as well as other storage areas such as packet buffers, etc., used by the switch fabric 350 for forwarding network packets or messages.

The various components of computer system 300 may be rearranged in various embodiments, and some embodiments may not require nor include all of the above components. Furthermore, additional components may be included in system 300, such as additional processors (e.g., a digital signal processor), storage devices, memories, network/communication interfaces, etc.

In the illustrated embodiment of FIG. 3, the methods and apparatuses reducing route table size according to the present invention as discussed above may be implemented as a series of software routines run by computer system 300 of FIG. 3. These software routines comprise a plurality or series of instructions to be executed by a processing system in a hardware system, such as processor 310. Initially, the series of instructions are stored on a data storage device 360 (e.g., in a route manager database), memory 320 or flash 330.

In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for reducing the size of a route table having a plurality of route entries, the method comprising:
   identifying a subset of route entries having a same next hop in a route table, the route entries within a range of prefixes;
   identifying a missing route for which no route entry exists within the subset of route entries, wherein the missing route prevents the subset of route entries within the range of prefixes from being contiguous in the route table;
   adding the missing route as a route entry to the route table to create a contiguous subset of route entries within the range of prefixes;
   adding a new route entry to the route table, the new route entry having a prefix corresponding to and longer than a prefix of the route entry of the missing route, wherein the new route entry has forwarding priority over the route entry for the missing route; and
   aggregating, by a processor, the contiguous subset of route entries into a single aggregated route entry in the route table.

2. The method of claim 1, further comprising:
   receiving an indication of a route entry deleted from the contiguous subset;
   maintaining an equivalent route entry in the route table corresponding to the deleted route entry;
   adding an additional route entry in the route table corresponding to the deleted route entry, the additional route entry having a prefix corresponding to and longer than a prefix of the equivalent route entry in the route table corresponding to the deleted route entry, wherein the additional route entry has forwarding priority over the equivalent route entry for the route entry deleted from the contiguous subset.

3. The method of claim 1, wherein each additional route corresponds to a different next hop than the next hop of the route entries in the contiguous subset of route entries.

4. The method of claim 2, wherein the additional route entry corresponding to the deleted route corresponds to a different next hop in the route table than the next hop of the equivalent route entry in the route table.

5. The method of claim 1, further comprising aggregating aggregated route entries into a single route entry to further compress the route table.

6. The method of claim 1, wherein identifying the subset of route entries having the same next hop in a route table further comprises identifying a subset of equal cost multi-path (ECMP) route entries in the route table having a same set of ECMP paths.

7. A non-transitory computer-readable storage medium having content stored thereon to provide instructions that, when executed by a processor in an electronic device, result in the electronic device performing a method for reducing the size of a route table having a plurality of route entries, wherein the method comprises:
   identifying a subset of route entries having a same next hop in a route table, the route entries within a range of prefixes;
   identifying a missing route for which no route entry exists within the subset of route entries, wherein the missing route prevents the subset of route entries within the range of prefixes from being contiguous in the route table;
   adding the missing route as a route entry to the route table to create a contiguous subset of route entries within the range of prefixes;
   adding a new route entry to the route table, the new route entry having a prefix corresponding to and longer than a prefix of the route entry of the missing route, wherein the new route entry has forwarding priority over the route entry for the missing route; and
   aggregating the contiguous subset of route entries into a single aggregated route entry in the route table.

8. The non-transitory computer-readable storage medium article of manufacture of claim 7, wherein the method further comprises:
   receiving an indication of a route entry deleted from the contiguous subset;
   maintaining an equivalent route entry in the route table corresponding to the deleted route entry;
   adding an additional route entry in the route table corresponding to the deleted route entry, the additional route entry having a prefix corresponding to and longer than a prefix of the equivalent route entry in the route table corresponding to the deleted route entry, wherein the additional route entry has forwarding priority over the equivalent route entry for the route entry deleted from the contiguous subset.

9. The non-transitory computer-readable storage medium of claim 7, wherein each additional route entry corresponds to a different next hop than the next hop of the route entries in the contiguous subset of route entries.

10. The non-transitory computer-readable storage medium of claim 8, wherein the additional route entry corresponding to the deleted route entry corresponds to a different next hop than the next hop of the equivalent route entry in the route table.

11. The non-transitory computer-readable storage medium of claim 7, wherein the method further comprises:
   aggregating aggregated route entries into a single route entry to further compress the route table.

* * * * *